UNITED STATES PATENT OFFICE.

PAUL WENTWORTH WEBSTER, OF PELHAM MANOR, NEW YORK, ASSIGNOR TO PERRY & WEBSTER INCORPORATED, OF NEW YORK, N. Y., A CORPORATION OF NEW JERSEY.

ART OF ACID MANUFACTURE.

1,390,410.  Specification of Letters Patent.  Patented Sept. 13, 1921.

No Drawing.  Application filed October 26, 1918.  Serial No. 259,775.

*To all whom it may concern:*

Be it known that I, PAUL W. WEBSTER, of Pelham Manor, in the county of Westchester, and in the State of New York, have invented a certain new and useful Improvement in the Art of Acid Manufacture, and do hereby declare that the following is a full, clear, and exact description thereof.

This invention relates to a method of separating mists from gases and more particularly to a method of separating sulfuric acid mists from chamber gases.

The object of the invention is to provide a process by which gaseous mists, vapors and fogs may be treated to effectively separate entrained liquid therefrom.

In the manufacture of sulfuric acid by what is known as the "chamber process," sulfur is burned to form sulfur dioxid gas, $SO_2$, which, passing through a "Glover tower" into the "chambers," is brought into contact with nitrous gases or nitric acid, and by one or more reactions is converted into sulfuric anhydrid gas, $SO_3$. The sulfuric anhydrid is converted into sulfuric acid, $H_2SO_4$, by contact with steam or water introduced into the chamber. The resulting sulfuric acid is largely in the form of a very fine mist floating in the gases of the chambers, and is condensed in the bottom thereof by condensation or by deposition on the surfaces of the condensing chamber, the factors of time and temperature influencing, among other things, the rate at which the acid is formed and deposited.

There is some reason for the belief that the particles of acid mist floating in or carried in the gases are more or less electrically charged, and that they may be so charged as to react negatively and be repellent to one another.

To effect the rapid and complete separation of the acid from the chamber gases in accordance with the present invention, the chamber gases containing the sulfuric acid mists are passed through a separator at such a high velocity that the particles of acid mist in the gases are brought into contact with one another with such a force that the particles will be combined to effect a separation or deposition of the liquid acid from the gases. The combination of the particles of the mist is preferably made by means of a rotary centrifugal separator, although the separation may be made by means of an impact separator which has a construction similar to the so-called impact type of steam separators. When using a centrifugal separator, the gases are sent through a separating chamber which is preferably rotating from 20,000 to 40,000 revolutions per minute, and under such a centrifugal force the heavy liquid particles of the mist are thrown out and retained against the wall of the separator while the lighter gases remain in the central portion of the separator and pass out of the separator. The centrifugal force drives the mist particles against the centrifugal wall with such an impact that they are united and condensed, and this action tends to form a wall of sulfuric acid into which incoming particles of mist are driven by centrifugal force. The sulfuric acid may be removed from the separator continuously or the separator may be intermittently stopped to permit removal of the acid.

To assist in condensing the finer particles of mist, sulfuric acid may be introduced into the centrifugal separator with the chamber gases containing mists. In this way, the acid supplied to the centrifugal separator will be sprayed through the gases undergoing separation and will help to entrain and carry the mist into the acid wall. The acid used for treating the gases undergoing centrifugal separation may be obtained from an outside source, but preferably it will be the acid which is continuously removed from the separator and returned to the gases undergoing separation.

The acid condensed by centrifugal force may be concentrated and in some cases it may be desirable to dilute the separated acids with water before returning them to the chamber gases undergoing centrifugal action.

Only a portion of the gases condensed in the centrifugal separator will be returned for treating the gases undergoing separation and the remainder of the acid which has been separated may be sprayed back into the sulfuric acid chambers where the sulfuric anhydrid is being formed.

By the method outlined above, the rate of formation of acid in the chambers may be accomplished more quickly and the amount of chamber space required may be greatly reduced as compared with the usual practice. The chamber gases may be easily subjected to centrifugal action within the sulfuric acid chamber or the gases may be led in a continuous circuit to and from the sulfuric acid chamber while undergoing centrifugal action. The treatment of gases undergoing centrifugal action by means of sulfuric acid does not incur an additional expense because the acid required for such treatment is formed from the gases and may be used in a continuous cycle.

The process outlined above may also be effectively used to separate the acid carried off in the fumes formed in the concentration of sulfuric acid by heat. To accomplish this, the fumes from the concentration kettle are collected and sent through a centrifugal separator and then exhausted. The fumes undergoing centrifugal separation may also be treated with sulfuric acid which is recovered from the centrifugal separator or which is supplied from an independent source.

While my invention has been illustrated as particularly adapted for separating sulfuric acid from chamber gases and from sulfuric acid fumes, the invention is also adapted for the recovery of hydrochloric acid mists and other mists which are formed in the presence of gases.

The preferred form of the invention having been thus described, what is claimed as new is:

1. The process of separating mist from gases by which the mist is carried, comprising subjecting said gases to strong centrifugal force and supplying to said gas-mist mixture under centrifugal action a liquid having the same chemical constitution as the mist.

2. The process of separating mist from gases by which the mist is carried, comprising subjecting said gases to strong centrifugal force to separate the mist as a liquid and returning the liquid to the gas-mist mixture undergoing centrifugal action to and in separating the mist.

3. The process of recovering an acid, comprising subjecting a gas carrying a mist to a strong centrifugal force and supplying to said gas-mist mixture undergoing centrifugal action an acid solution having the same chemical constitution as the mist.

4. The process of recovering a sulfuric acid, comprising subjecting gases containing sulfuric acid mist to strong centrifugal force and supplying to the gas-mist mixture undergoing centrifugal action a solution of sulfuric acid.

5. The process of recovering an acid, comprising subjecting a gas carrying a mist to a strong centrifugal force, collecting acid condensed by the centrifugal impact, diluting the collected acid, and supplying to said gas-mist mixture undergoing centrifugal action said diluted acid.

6. The process of recovering sulfuric acid, comprising supplying an acid-collecting liquid to gases containing a sulfuric acid mist and simultaneously subjecting the gas, mist and fluid to a strong centrifugal force.

7. The process of recovering a sulfuric acid, comprising concentrating sulfuric acid by heat, collecting fumes formed by evaporation, subjecting the fumes to a strong centrifugal force, and supplying to the fumes undergoing centrifugal action a solution of sulfuric acid.

In testimony that I claim the foregoing I have hereunto set my hand.

PAUL WENTWORTH WEBSTER

Witnesses:
V. K. BOYNTON,
ANNA H. BAUMANN.